United States Patent
Johnakin, III

(10) Patent No.: US 6,619,236 B1
(45) Date of Patent: Sep. 16, 2003

(54) BIRD SAFETY PEDICURE PERCH APPARATUS

(75) Inventor: E. Kimble Johnakin, III, Clermont, GA (US)

(73) Assignee: Just Selling, Inc., Clermont, GA (US)

( * ) Notice: Subject to any disclaimer, the term of this patent is extended or adjusted under 35 U.S.C. 154(b) by 0 days.

(21) Appl. No.: 10/109,082

(22) Filed: Mar. 29, 2002

(51) Int. Cl.⁷ .............................. A01K 31/12
(52) U.S. Cl. ...................... 119/468; 119/537
(58) Field of Search ................ 119/467, 468, 119/531, 537

(56) References Cited

U.S. PATENT DOCUMENTS

| | | | | |
|---|---|---|---|---|
| 2,076,734 A | * | 4/1937 | Leindorf | 119/468 |
| 2,241,259 A | * | 5/1941 | Hanson | 119/468 |
| 2,570,663 A | * | 10/1951 | Guarino | 119/468 |
| 4,497,278 A | * | 2/1985 | Balder et al. | 119/537 |
| 5,018,480 A | * | 5/1991 | Goldman et al. | 119/468 |
| 5,533,466 A | * | 7/1996 | Kohus et al. | 119/459 |
| 5,588,397 A | * | 12/1996 | Johnakin, III | 119/468 |
| 6,332,431 B1 | * | 12/2001 | Brown | 119/600 |

* cited by examiner

Primary Examiner—Charles T. Jordan
Assistant Examiner—Kimberly S. Smith

(57) ABSTRACT

Provided is an elongated bird safety pedicure perch. The perch is a combination safety excerise perch and nail trimming device. The perch offers two safe smooth sides for the bird to stand on to protect the tender pads of the bird's feet from harsh abbrasive surfaces; along with smooth ridges and rounded radiuses to exercise the birds leg and feet muscles. The other two sides have the coarse texture, needed to keep the birds nails in a naturally healthy state of trim. A connection assembly, which acceptably includes a threaded rod, two fender washers and a nut, are used to mount the entire bird safety pedicure perch apparatus to a bird cage or similar structure. The perch is preferably made of a solid, abrasive material, such as concrete or resin with a gritty aggregate material embedded therein, so that the abrasive properties of the material preferably stay constant.

2 Claims, 4 Drawing Sheets

BIRD SAFETY PEDICURE PERCH APPARATUS

BACKGROUND OF THE INVENTION

The present invention relates to devices used by domesticated exotic birds and more particularly to devices that condition the nails, leg muscles, and feet of birds.

Bird's nails are constantly growing. If not periodically trimmed and conditioned the health and safety of the pet will be diminished. This will potentially cause discomfort and can be harmful to the pet bird. For wild birds, their nails are kept in a natural state of trim by standing, walking, and rubbing abrasive objects in the wild. All birds will naturally scrape and rub their nails upon those abrasive surfaces they find in their environment. The natural perch shapes found in the wild also stimulates the leg and feet muscles of birds.

Pet bird owners have conventionally provided their bird with perches having abrasive surfaces for trimming their nails. Items commonly found in pet stores are wood, wood wrapped in sandpaper, and various materials with a glued on sanded surface. Most of the time, bird owners must take there pet to the vet to have his nails and beak trimmed or to get care for foot sores from poorly design perches. It is very traumatic for birds to go through this procedure. Birds hate to be manhandled and restrained.

The existing dangers with what products are available to pet birds are the round wood designs, which actually sharpen the nails. Glued sanded surfaces, which are harmful to the tender pads on the pet bird's feet and may cause serious foot sores. Other concerns are the poorly designed shapes and textures that put stress on the leg and feet muscles of the pet bird.

SUMMARY OF THE INVENTION

Briefly described, the preferred embodiments of the present invention provide a safe, natural shape perch. Smooth surfaces on the sides where the tender pads of the pet bird's feet are in contact with the perch. Along with a comfortable radius, textured surfaces on the sides where the nails touch the perch. Natural shapes, depth, and a decreasing width from the base end to the end for leg muscle stimulation, all in a single product. The improved bird safety pedicure perch apparatus is constructed and arranged such that when a bird is standing upon the perch the bird can safely trim its nails without cutting or irritating the tender pads of its feet and at the same time receive exercise for feet and leg muscles. A connection assembly, which acceptably includes a threaded rod, two fender washers, and nut, is attached to the base end of the perch, from which the perch rod extends. The connection assembly functions such that the entire bird safety pedicure perch apparatus can be easily mounted to a birdcage or aviary.

The perch of the preferred embodiments of the present invention are preferably made of a solid, abrasive material, such as, but not limited to, concrete; gypsum, plaster or resin with gritty aggregates embedded therein. Non-toxic pigments are preferably employed to add color to the perch.

It is therefore an object of the present invention to provide an improved and much safer convenient system for use by a bird for trimming its nails without harming the tender pads of its feet, and stimulate the muscles of its legs and feet.

Another object of the present invention is to promote the health of birds.

Yet another object of the present invention is to increase the comfort of birds.

Still another object of the present invention is to provide a safer perch for avian breeding.

Still another object of this invention is to provide a higher degree of convenience for pet bird owners and breeders by decreasing the manhandling, restraining visits to the vet to have the nails trimmed.

Still another object of this invention is to provide an article of manufacture that is generally maintenance free.

DETAILED DESCRIPTION OF THE INVENTION

Figure 1:
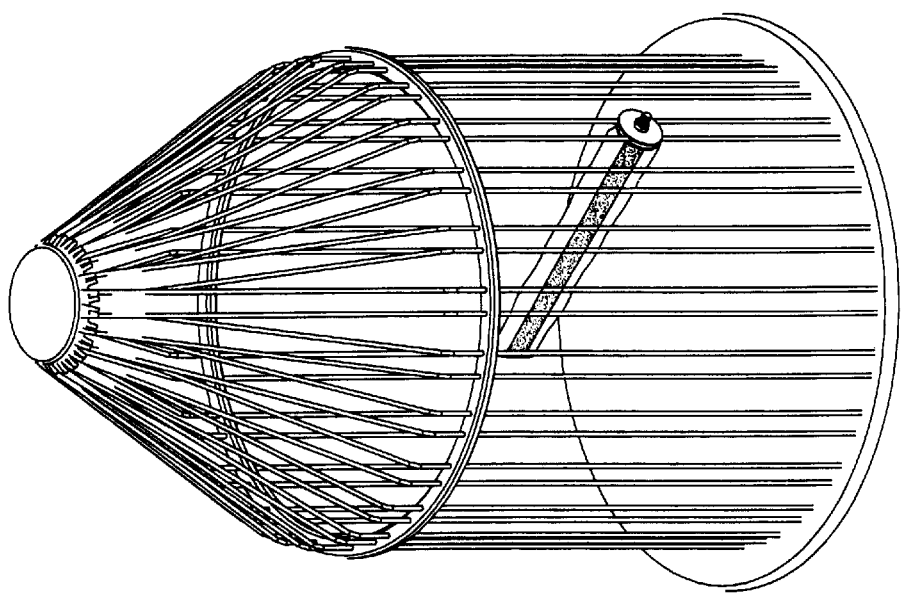
FIG. 1 is a schematic, left side view of an improved bird safety pedicure perch apparatus installed in a bird cage, in accordance with preferred embodiments of the present invention.

Referring now in greater detail to the drawings, in which like numerals represent like components throughout the several views. FIG. 1 is a schematic, left side view of an improved bird safety pedicure perch apparatus mounted to a structure which is depicted, for example and not limitation, as a conventional birdcage. In accordance with the preferred embodiments of the present invention, the bird safety pedicure perch apparatus includes elongated perch, threaded rod, two fender washers and nut such as, but not limited to a nylon lined lock nut.

Figure 2:
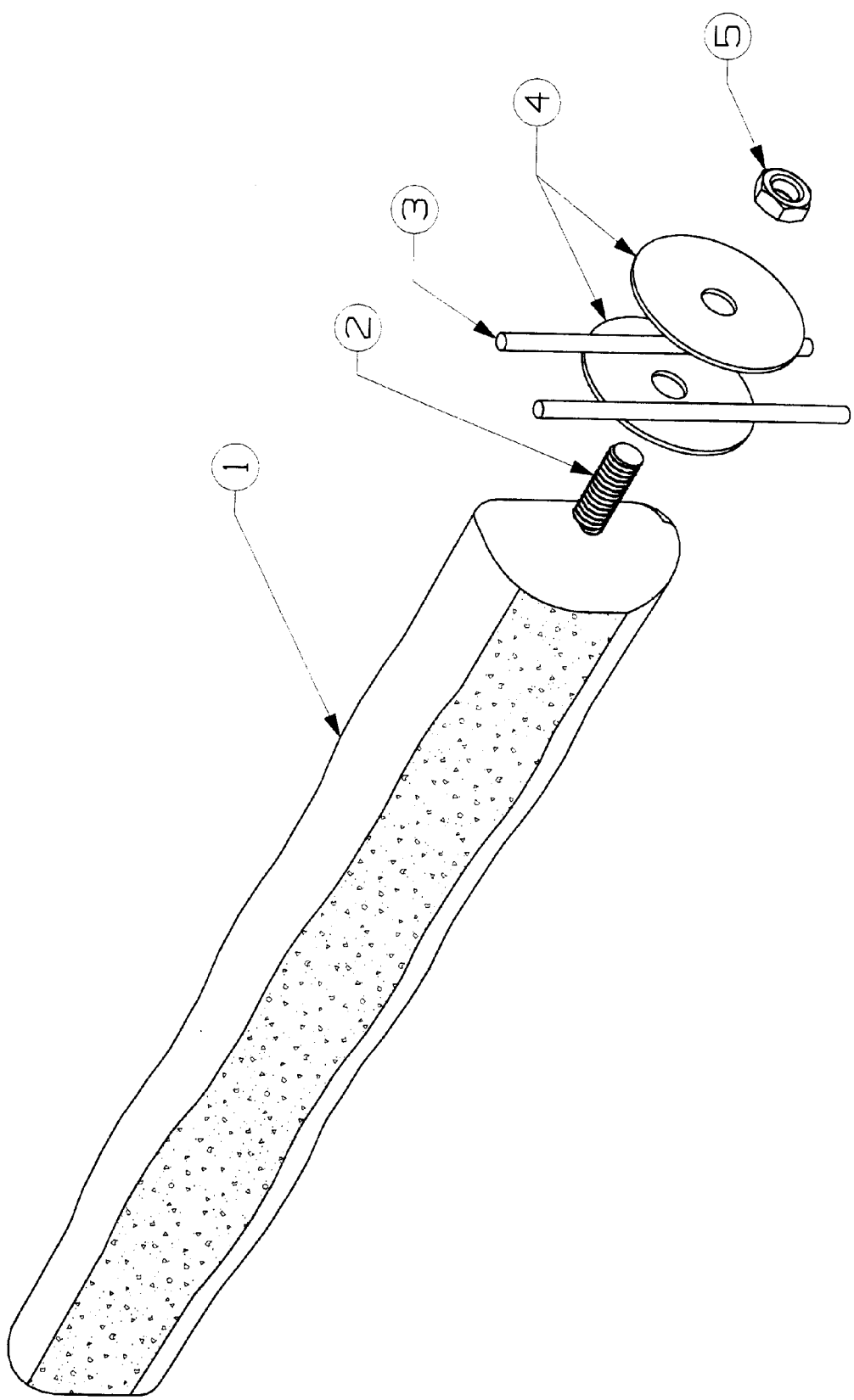
FIG. 2 is an isolated, schematic, left, top and bottom side view of the bird safety pedicure perch apparatus.

FIG. 2 is an isolated, schematic, left side view of the bird safety pedicure perch apparatus 1, in accordance with the preferred embodiments of the present invention. In accordance with the preferred embodiments, top, bottom and left side views of the combined stabilizing threaded rod 2 is axially aligned within and embedded in to the perch. Threaded rod is as long as the perch 1, but not limited to this length. The stabilizing threaded rod extends axially out of and away from the base surface of the perch 1 so as to form a bolt structure to facilitate the mounting of the bird safety pedicure perch apparatus 1. The stabilizing rod 2 is acceptably made of metal and the base end is preferably threaded to receive the nut 5. The first of two fender washers 4 slides onto the threaded rod 2 up against the base end of the perch 1. The perch 1, threaded rod 2 and first of two fender washers 4 are then axially pushed through the cage structure 3 from the in side. A second fender washer 4 and nut 5 complete the mounting of the bird safety pedicure perch apparatus.

Figure 3:
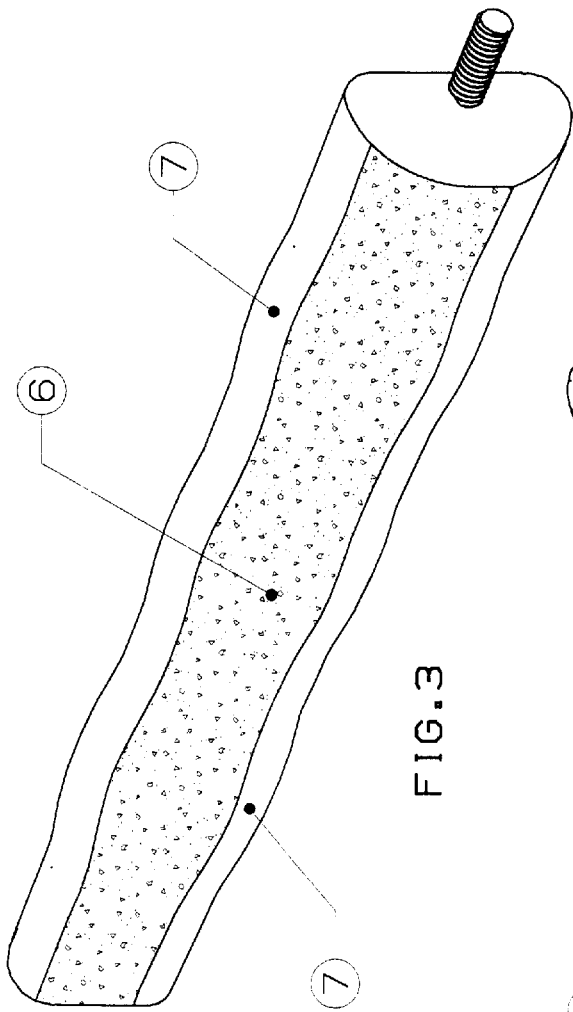
FIG. 3 is a schematic, left, top and bottom side view of the bird safety pedicure perch apparatus.

FIG. 3 is a schematic, left, top and bottom side view of the bird safety pedicure perch apparatus. In the most preferred embodiment of the present invention, the surface 7 of the bird safety pedicure perch apparatus define a multiplicity of natural shaped ridges and valleys with a comfortable radius and generally smooth surface that simulate the top side of a tree branch. In that most preferred embodiment, the surface 6 define a multiplicity of hard, protruding nodules and grit particles that generally simulate a very coarse sand paper texture.

Figure 4:
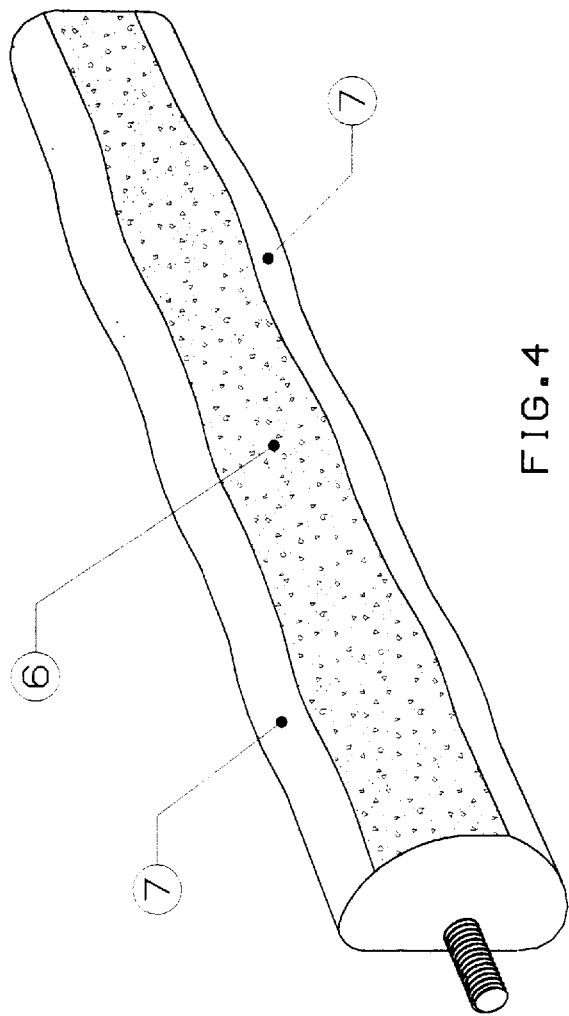
FIG. 4 is a schematic, right, top and bottom side view of the bird safety pedicure perch apparatus.

FIG. 4 is a schematic, right, top and bottom side view of the bird safety pedicure perch apparatus. In the most preferred embodiment of the present invention, the surface 7 of the bird safety pedicure perch apparatus define a multiplicity of natural shaped ridges and valleys with a comfortable radius and generally smooth surface that simulate the top side of a tree branch. In that most preferred embodiment, the surface 6 define a multiplicity of hard, protruding nodules and grit particles that generally simulate a very coarse sand paper texture.

Figure 5:
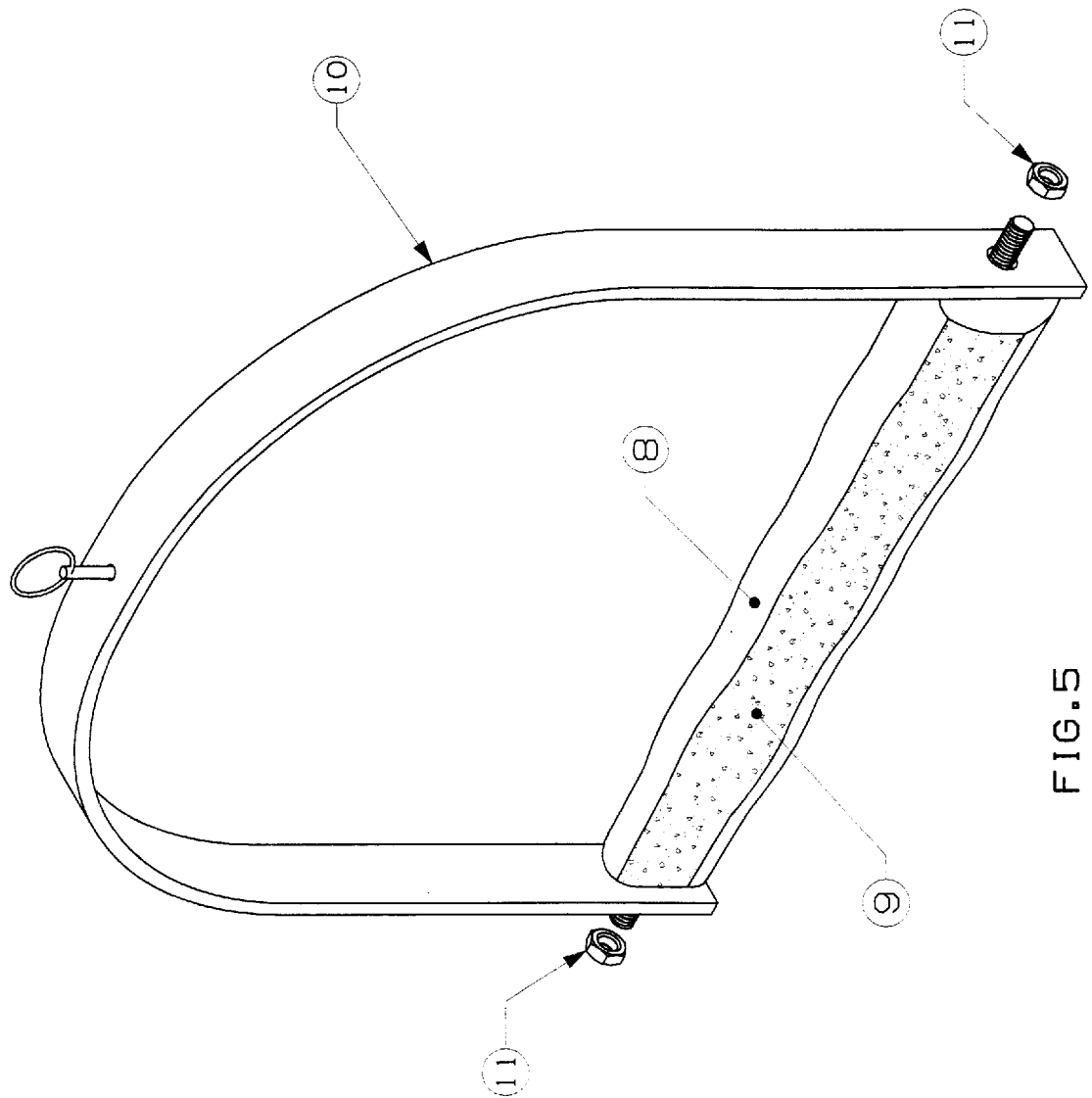
FIG. 5 is a schematic, left side view of an improved bird safety pedicure perch apparatus mounted to a swing structure.

FIG. 5 is a schematic, left side view of an improved bird safety pedicure perch apparatus mounted to a swing structure 10 which is depicted, for example and not limitation, as a bird swing. In the most preferred embodiment of the present invention, the surface 8 of the bird safety pedicure perch apparatus define a multiplicity of natural shaped ridges and valleys and a generally smooth surface with a comfortable radius which decreases from one end to the other end. In that most preferred embodiment, the surface 9 define a multiplicity of hard, protruding nodules and grit particles that generally simulate a very coarse sand paper texture.

Referring to FIG. 3, in accordance with the preferred embodiments of the present invention, the perch is cast in one mold. The uncured material which is cast into the mold is preferably of a type that, once cured, will provide an abrasive exterior surface 6 on the textured sides where the birds nails grip and a smooth surface 7 on the top where the pads of the birds feet rest. The uncured material preferably cures to form a solid structure that is embedded with abrasive materials or aggregate such that as the portions of the solid structure where the birds nails grip are always exposed to a abrasive material.

Referring to FIG. 3, in accordance with the preferred embodiments of the present invention, the bird safety pedicure perch apparatus, generally the abrasive exterior surface 6 is two times as wide as the smooth surface 7. The strategically placed abrasive exterior surface 6 in combination with the smooth surface 7 functions to trim the birds nails, exercise the birds feet and leg muscles without harming the pads of the birds feet.

While the embodiments of the present invention have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative dimension and relationships shown on the drawings are given as the preferred relative dimension and relationships, but the scope of the invention is not to be limited thereby.

I claim:

1. A bird safety pedicure perch apparatus for connection to a structure, the apparatus comprising:

a single-cast molded perch having an attached end and a free end opposite said attached end, said attached end being securable to said structure;

an exterior surface extending between said attached end and said free end; said exterior surface comprising a series of undulating curves being substantially symmetrical in mirror image along a top surface and a bottom surface of said perch, said perch having a width measured from a point along a curve of the top surface to a mirror-image point along a curve of the bottom surface, wherein the width of the perch tapers from the attached end to the free end such that the width measured at a given point along a curve is less than the width measured at a corresponding point on a previous curve closer to said attached end; and, wherein the top surface and the bottom surface are smooth in texture with a middle section extending between said top and bottom surfaces having a coarse texture.

2. The bird safety pedicure perch apparatus of claim 1 wherein a threaded rod is axially aligned and embedded into the attached end of said perch.

\* \* \* \* \*